INVENTOR
GEORGE H. MCLAUGHLIN
HERBERT A. HARVEY

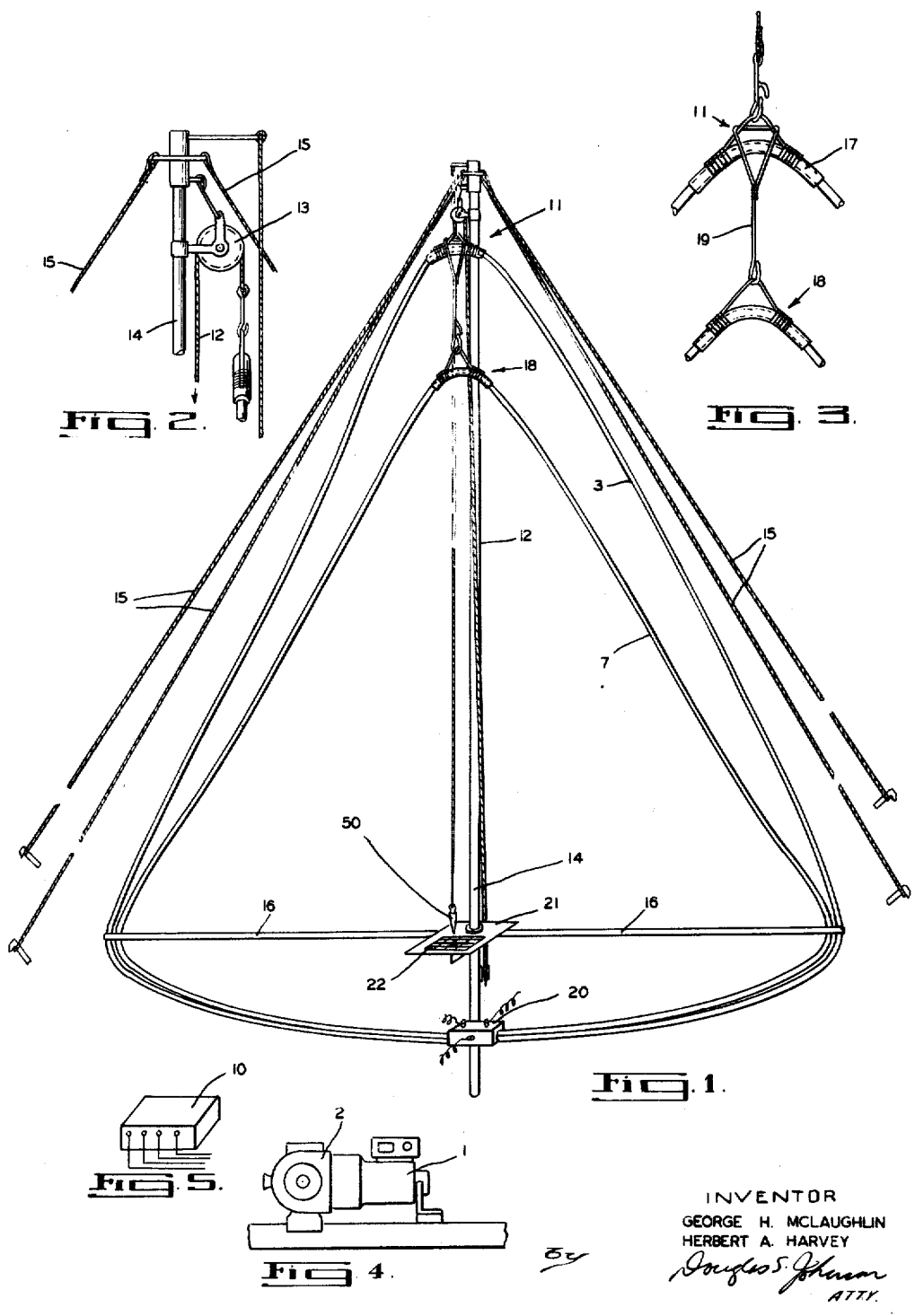

Dec. 29, 1959     G. H. McLAUGHLIN ET AL     2,919,396
APPARATUS FOR ELECTROMAGNETIC INDUCTION SURVEYING
Filed Jan. 31, 1955     3 Sheets-Sheet 3
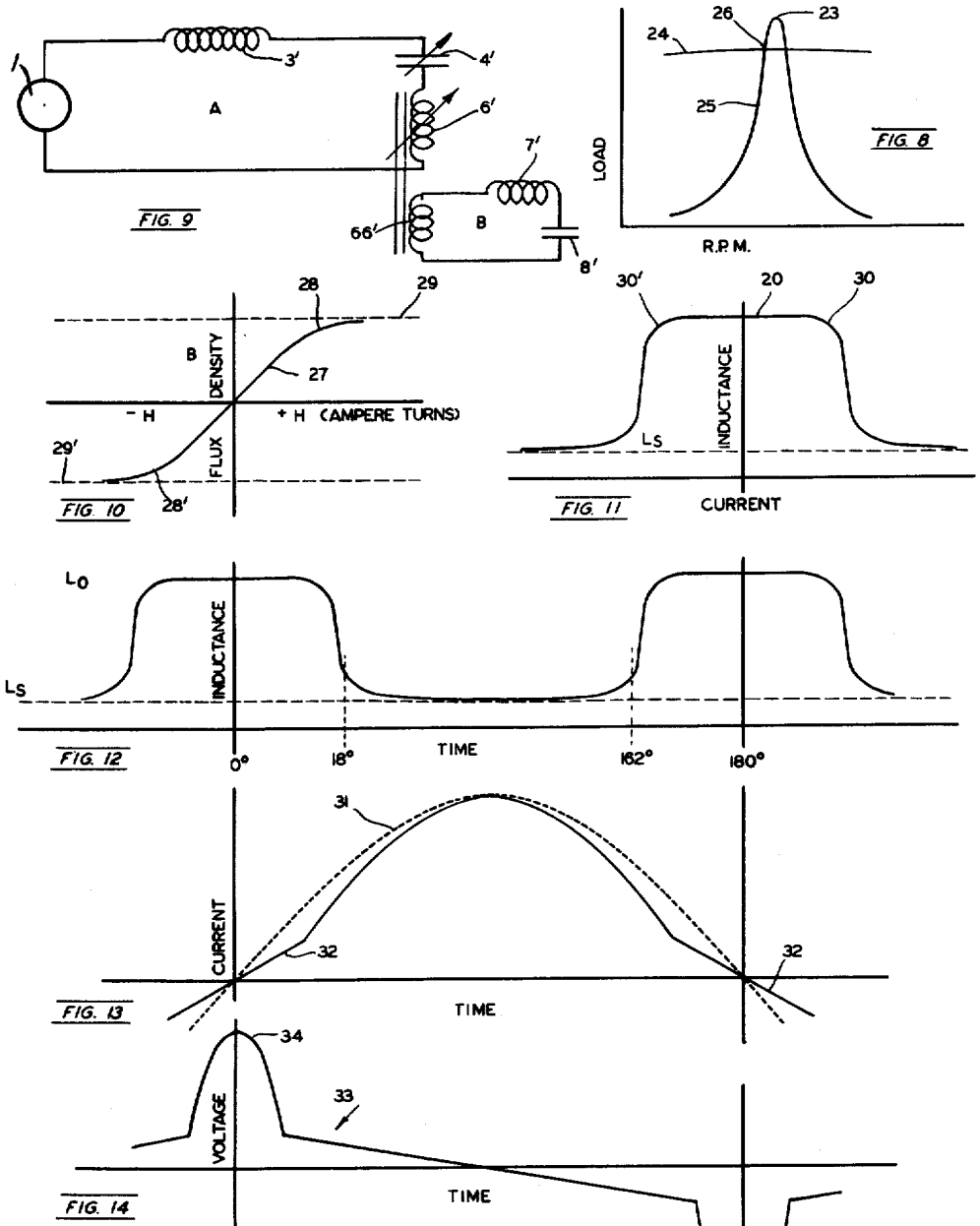
INVENTORS
GEORGE H. McLAUGHLIN
HERBERT A. HARVEY
BY *Douglas S. Johnson*
ATTY.

United States Patent Office 2,919,396
Patented Dec. 29, 1959

2,919,396

APPARATUS FOR ELECTROMAGNETIC INDUCTION SURVEYING

George H. McLaughlin and Herbert A. Harvey, Toronto, Ontario, Canada, assignors to The McPhar Engineering Company of Canada Limited, Toronto, Ontario, Canada Application January 31, 1955, Serial No. 485,088

9 Claims. (Cl. 324—5)

This invention relates to improvements in the art of electromagnetic induction surveying for locating commercially valuable subterranean electrically conductive bodies such as lead, copper and zinc ore bodies, and more particularly to an improved apparatus and method for carrying out such surveying.

In United States Patent No. 2,558,972 of July 3, 1951, there is described an electromagnetic induction method and apparatus for locating subterranean conductor bodies. Very generally such electromagnetic prospecting method comprises the step of creating an alternating electromagnetic field by means of an energized transmitter coil and detecting changes in, or disturbances of the field caused by the presence of a conductor body with which the field becomes linked as a means of indicating the presence of such conductor body.

It has been found from both theoretical and empirical investigations that the response or effect of any given conductor changes with the frequency of the investigating alternating electromagnetic field up to a given frequency where a saturation effect is experienced and there is no further increase in effect or response with increased frequency of the investigating electromagnetic field.

It has therefore been conceived that if a change be made in the frequency of the alternating electromagnetic field and the effect or the response of the buried conductor be noted at the different frequencies then the degree of conductivity can be ascertained.

For instance, if it were found that the effect of the presence of the conductor body was as large at a low frequency, say 1,000 cycles per second, as at a higher frequency, say of 5,000 cycles per second, then it would be known that the conductor body was a good conductor such as a lead, iron or copper sulphide body.

On the other hand, if the effect of the presence of the conductor increased as the frequency of the alternating electromagnetic field increased, then it would be known that the conductor body was a poorer conductor such as a graphite body.

If reliance were placed simply on the magnitude of the effect of the conductor body at one frequency, say 1,000 cycles per second, it would not be known whether the effect was caused by a relatively smaller but commercially valuable good conducting ore body or a relatively larger non valuable poorer conducting buried deposit.

Because of the necessity of obtaining a high degree of stability in the frequency of the alternating electromagnetic field and the problems of tuning to the stable frequency particularly the tuning of the receiver coil to obtain sensitive detection of the electromagnetic field it has not heretofore been found possible to provide any convenient and reliable method of carrying out surveying using two or more frequencies in order to ascertain the degree of conductivity of the buried conductor body.

In this connection it will be appreciated that a survey could be duplicated first at one frequency and then at another, employing first apparatus that operated at the one frequency and then apparatus operating at the other frequency but such a procedure would require double the time and double the cost of the present single frequency electromagnetic prospecting method such as described in said patent.

It is therefore one of the important objects of the present invention to enable electromagnetic induction surveying to be carried out using two or more exploring electromagnetic fields of different frequencies without materially increasing the time or cost of the survey of seriously increasing the complexity, weight or portability of the apparatus required.

Still another important object is to enable electromagnetic prospecting to be carried out at two or more frequencies while maintaining the requisite degree of frequency stability of each of the exploring electromagnetic fields of different frequencies.

Another important object is to enable such a multi frequency electromagnetic induction method to be carried out with a single transmitting unit comprising the means for creating the exploring alternating electromagnetic field and a single detector or receiver unit for detecting the alternating electromagnetic field created by the transmitter unit and for determining from a measurement of the field direction the presence of a conductor body.

The principal feature of the invention resides in creating from a single source of alternating electrical energy at least two alternating electromagnetic fields by distorting the fundamental current, that is the current drawn from the electrical source of the frequency at which it is supplied by the source, by introducing a non linear element into the transmitter circuit to produce an alternating current rich in harmonics and then utilizing the fundamental and/or one or more harmonics of the fundamental current to energize two or more tuned transmitting coils to simultaneously create two or more alternating electromagnetic fields of different frequencies.

Another important feature resides in providing a novel receiver coil arrangement in which a single set of detector coil elements is connectable first to enable an electromagnetic field of one frequency to be detected while fields of another or other frequencies are substantially ignored, and subsequently are connectable to substantially ignore the first electromagnetic field and to detect a field or fields of other frequencies.

Another and important feature resides in arranging one of the transmitter coils to form a steeply rising resonant load imposed on a gasoline driven motor generator to maintain the motor speed and hence generator frequency constant as disclosed in said patent, and so arranging the non-linear distorting element in the output circuit of the motor generator so that while producing harmonics in the alternating current delivered by the generator the frequency regulating effect of the last mentioned transmitter coil will not be materially disturbed and the coil can be operated at a substantially constant frequency near the frequency to which it is tuned and the second or subsequent transmitter coil can be energized to operate at a substantially constant harmonic frequency to which it is tuned.

These and other objects and features will become apparent from the following description with reference to the accompanying drawings, in which:

Figure 1 is a front elevational view of a transmitter coil assembly for creating two electromagnetic fields in accordance with the invention.

Figure 2 is a fragmentary side elevational view of the upper end of the central support of the transmitter coil assembly.

Figure 3 is an enlarged fragmentary front elevation showing the manner in which the inner transmitter coil is separated and supported from the outer and larger transmitter coil.

Figure 4 is an elevational view of a gasoline engine driven generator forming the source of electrical energy for the transmitting coil assembly of Figure 1.

Figure 5 is a perspective view of the control box including the electrical components forming in conjunction with the transmitter assembly the load imposed on the generator of Figure 4 when operating to energize the transmitting coil assembly.

Figure 8 is a graph of the sharply rising load represented by the tuned transmitting coil tuned substantially to the fundamental frequency of the gasoline engine driven generator plotted against revolutions per minute and showing the relatively flat graph of the horsepower output of the gasoline engine plotted against revolutions per minute intersecting the load curve.

Figure 9 is a simplified schematic wiring diagram of the transmitter coil assembly corresponding to Figure 6 for facilitating explanation of the multiple frequency system.

Figure 10 is a graph showing the relationship of flux density and field intensity in the saturable magnetic core reactor included in the transmitting system as the current from the generator goes through a reversal in changing from negative to positive in its cycle.

Figure 11 is a graph of the inductance in an idealized saturable magnetic core reactor as the current through the reactor changes from a minus to a plus value.

Figure 12 is a graph illustrating the inductance of the saturable core reactor over a half cycle of the generator current.

Figure 13 is a graph illustrating the distortion of the fundamental current of the generator from sinusoidal form due to the introduction of the inductance placed in the output transmitter coil circuit of the generator by means of the saturable magnetic core reactor.

Figure 14 is a graph showing the voltage produced across the secondary of the magnetic core reactor illustrated in the simplified circuit of Figure 9 as a result of the current flow of the distorted waveform of Figure 13 in the primary circuit of Figure 9.

With reference first to Figures 1 to 6 inclusive, the transmitter unit of the electromagnetic induction prospecting equipment in accordance with the invention comprises an alternating current generator 1, Figure 4, driven by a gasoline engine 2 and it has been found that a lightweight engine driven generator which is readily portable by a single man, the engine of which generates approximately 1 horsepower at full throttle setting at a speed to produce 1,000 cycle current from the generator is highly satisfactory.

Figure 6:
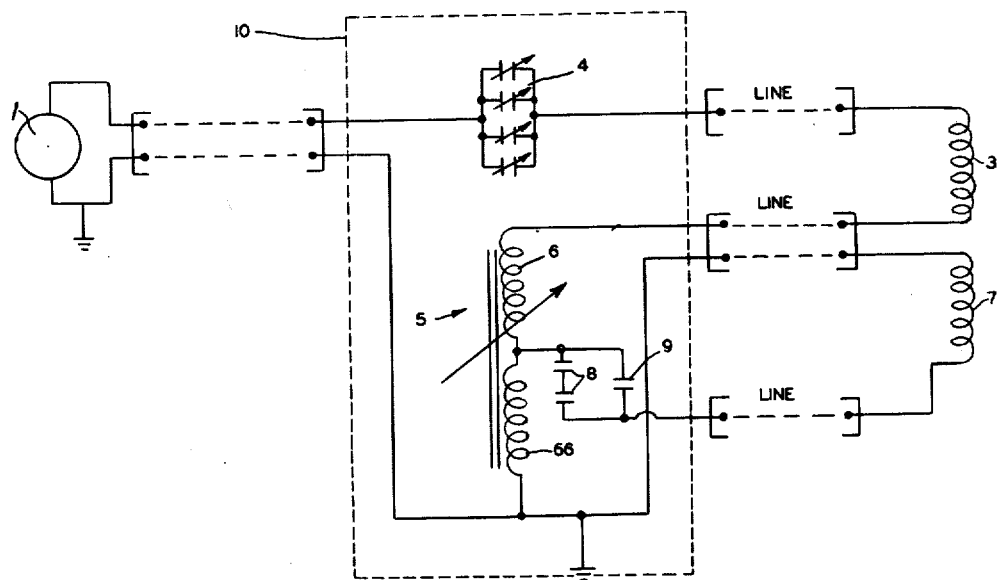
Figure 6 is a schematic circuit diagram of the transmitting unit.

The generator 1 is connected to a series tuned main transmitting coil 3 through suitable tuning condensers 4, Figure 6, and a non-linear device 5 in the form of a saturable magnetic core reactor shown as having winding sections 6 and 66, is connected in series with the main transmitting coil 3 across the output of the generator 1. A second or auxiliary transmitting coil 7 is connected across the winding section 66 of the saturable magnetic core reactor 5, and is series tuned by means of condensers 8 and 9.

The connection from the generator to the transmitting coils 3 and 7 are made through a connector box 10, Figure 5. The transmitting coil 3 is of triangular shape and is supported from its upper "apex" 11 by means of a cable 12 passing over a pulley 13 suspended from a central vertical pole or rod 14 held in the erect position by guy ropes or cables 15.

The lower portion of the transmitting coil 3 is held apart by a spreader bar 16 and the coil thus supported can be accurately set in a vertical position as determined by a plumb bob 50, but can be swung azimuthally while being maintained in a vertical plane. A sleeve 17 surrounding the coil 3 at the "apex" 11 prevents bending of the wires making up the coil at this point to a degree which would cause rupture.

The secondary or auxiliary transmitting coil 7 is located within the main coil 3 and is again of triangular form with its center approximately coinciding with the center of coil 3 and is supported from its "apex" 18 by a depending hanger 19 supported from the apex of the coil 3. Each of the coils 3 and 7 may be considered as point field sources located at their centers, and thus the fields created by the coils may be considered as emanating from substantially coincident point sources. The spreader bar 16 also serves to maintain the spread of the inner auxiliary coil 7 and the coils at their bottoms are threaded through a connector box 20. The auxiliary transmitting coil 7 by virtue of its support from the apex of the main coil 3 and the manner in which it is "tied" to the main coil by means of the spreader bar 16 and box 20, is constrained to maintain a coplanar relation with the coil 3 as the coil 3 is swung azimuthally.

A chart 21 including grid markings 22 may be provided to enable the azimuthal orientation of the transmitting coils 3 and 7 to be quickly determined. The main transmitting coil 3 is series tuned by the condensers 4 to impose a resonant load on the generator 1 as indicated in Figure 8 so that the apex 23 of the load extends above the maximum horsepower represented by the curve 24 in Figure 8 for the gasoline engine 2, or in the event that a larger engine is used above the maximum horsepower output developed by such larger engine for the throttle setting at the operation point of the engine.

Thus the horsepower curve 24 is arranged to intersect the resonant load curve 25 of the transmitter coil 3 at a point below the apex 23 and at a point where the load curve 25 is steeply rising. With this arrangement the load comprising the series tuned transmitter coil 3 imposed on the generator 1 and hence on the gasoline engine 2 automatically regulates the speed of the engine to maintain its speed relatively constant independent of power variations of appreciable magnitude. In this way the frequency of the generator is regulated so that it, in turn, is maintained within small limits of variation as the engine horsepower varies over the much wider range encountered in normal engine operation as fully explained in the said United States Patent No. 2,558,972.

Thus it will be appreciated from Figure 8 that, under the conditions of the horsepower output of the engine fluctuating above and below the horsepower represented by the curve 24, because the horsepower curve intersects the steeply rising load curve at an operating point 26 on the steeply rising portion of the curve 25, there will be an enormous change of load for an extremely small change in engine speed. Thus if the output horsepower of the engine increases tending to cause it to run faster, it will be faced with a load capable of absorbing all of the increased power at a speed very slightly higher than its normal speed. When the output power drops again the load imposed by the transmitter coil 3 will quickly slow the generator and hence engine back down to its normal operating speed represented by the operating point 26.

On the other hand, upon the output power of the engine dropping tending to cause it to slow down, its slowing by only a few revolutions per minute presents a situation where it has imposed on it a greatly reduced load which it is capable of supplying at the slightly reduced speed. On increase of the horsepower back to its normal, the engine will find itself with a marked excess of power over the power necessary to drive the load at the slightly reduced speed at which it was operating, enabling it to quickly speed up to the operating point 26.

By employing as the non-linear device for producing harmonics of the fundamental current delivered by the generator 1 a saturable magnetic core reactor having a low resistance and an inductance of the order of 20 percent or less of the inductance of the main transmitting coil 3, it has been found possible to maintain the frequency regulating effect of the resonant load constituted by the series tuned main transmitting coil 3, for good frequency stability, while employing a lightweight gasoline engine driven generator as above described.

The reactor 5 is utilized to excite the auxiliary transmitting coil 7, and its operation will be more fully understood with reference to the simplified circuit diagram illustrated in Figure 9, and with reference to the wave forms illustrated in Figures 10 to 14 inclusive.

Referring to Figure 9, the main transmitter coil 3 is indicated as an inductance 3' and the tuning condensers are represented by a single condenser 4'. The non-linear device 5 is represented as a primary winding in the form of a variable inductance 6', and the second winding section 66 is represented by the secondary 66'. The auxiliary transmitting coil in Figure 9 is represented at 7' as an inductance with the condensers 8 and 9 being represented by a single condenser 8'.

In the particular system illustrated, the fundamental current delivered by the generator 1' is chosen as an example as a current of 1,000 cycles per second to which the series tuned circuit comprising the inductance 3' and condenser 4' and variable inductance 6' is approximately tuned. As the apex 23 of the resonant load formed by the series resonant circuit 3', 4', 6' and the generator 1' is to lie above the operating point 26 as explained in connection with Figure 8 the actual resonant point of this circuit is chosen somewhat higher than the 1,000 cycle frequency of the generator. The series tuned circuit comprising the inductance 7', condenser 8' and the secondary 66' is chosen to resonate at least approximately at 5,000 cycles per second which comprises the fifth harmonic of the fundamental current flowing in the generator circuit.

In the art of geophysical electromagnetic induction prospecting the selected frequencies are considered as low frequencies, the low frequency band of the spectrum being considered to coincide approximately with the audio frequency band. As indicated with reference to Figure 10, the saturable magnetic core reactor which preferably employs a core of ferroxcube, but which may employ a core of iron or other magnetic material, is arranged to saturate when the alternating current of substantially sinusoidal form delivered by the generator has risen from zero to its value at the point 18° from the zero point, i.e. is arranged to saturate at 18°.

The curve 27 of the flux density in the saturable magnetic core reactor plotted against the field intensity in the reactor, that is, the ampere turns of the reactor, increases essentially linearly from zero to the knee 28 at which point the core becomes essentially saturated, and the curve then asymptotically approaches the value represented by the dotted line 29.

The knee 28 of the curve 27 occurs at the point where the current flowing through the "primary circuit" indicated at A in Figure 9 reaches its 18° value. The portion of the curve from zero in Figure 10 through the knee 28 is correspondingly reproduced below and on the opposite side of the abscissa and ordinate respectively having a bottom knee 28' and approaching the bottom dotted line 29'.

The result is that through the region from 28' to 28 the permeability of the magnetic material of the core of the saturable reactor 5 has a relatively high value which drops to a low value at the points of saturation 28 and 28'. The effect of the reactor 5 in its function as an inductance included in the primary circuit A is illustrated in Figure 11. At points corresponding to the points 28' and 28 and indicated by the knees 30' and 30, the inductance $L_o$ of the reactor drops rapidly to the inductance $L_s$ of the saturated value as the current increases in magnitude, either in the negative or positive direction.

Figure 12 shows the inductance of the saturable magnetic core reactor 5 plotted over one-half cycle of the fundamental current delivered by the generator 1' clearly depicting its non-linear characteristic.

Figure 13 illustrates the effect of the presence of this non-linear device in the circuit A showing the manner in which the sinusoidal current wave form 31 shown in dotted lines is distorted having a reduced slope from the point "—18°" to the point "+18°" as indicated at 32, corresponding to the points where the core of the reactor becomes saturated.

Figure 14 depicts the voltage wave form indicated generally at 33 appearing across the secondary 66' of the reactor, that is, the voltage wave form appearing across the series resonant elements 7' and 8' of the secondary circuit B of Figure 9. The voltage wave form 33 includes the sharp positive and negative voltage pulses 34 occurring each tenth of a cycle of the generator frequency, and these voltage pulses are used to excite the series resonant circuit 7' and 8' which is tuned to the fifth harmonic of the generator 1' in the example illustrated.

In the absence of a magnetic bias applied to the reactor 5 any odd harmonic of the generator can be selected as the second frequency by choosing the resonant frequency of the circuit elements 7' and 8'. By adding a magnetic bias the even harmonics can be obtained if desired.

While the operation of the magnetic core reactor has been described in connection with the somewhat simplified circuit of Figure 9, the same effects take place in the circuit of Figure 6, but instead of the voltage pulses being produced across an artificial secondary 66' represented in Figure 9, the reactor 5 may be considered as a normal transformer with the winding section 66 corresponding to the secondary 66' of Figure 9. It is to be noted that by employing the reactor 5 the coil 7 can be connected across such portion of the reactor winding as will provide proper impedance matching to increase the magnitude of the second electromagnetic field.

The voltage pulses corresponding to the pulses 34 which are used to excite the series tuned circuit comprising the condensers 8 and 9 and the secondary or auxiliary transmitting coil 7 resonate this latter circuit for example at approximately 5,000 cycles per second. However, as the inductance of the reactor 5 which is also included in the circuit varies over a period of the fundamental frequency, the resonant frequency of this circuit will vary slightly from the 5,000 cycle per second point, but this variation can be nullified by sharp tuning of the receiver coils hereinafter more fully described and the fine tuning condenser 9 is adjusted for maximum output at the selected harmonic, in the present illustration of the fifth harmonic.

It is important to note that the main transmitter coil 3 forms an isolating impedance to prevent the low impedance generator from shorting out the harmonics generated by the saturable reactor.

Because the pick-up voltage at a receiving station increases with frequency the field strength of the secondary transmitting coil 7 operating at 5,000 cycles per second need not be as large as the field strength produced by the primary or main transmitting coil 3 operating at 1,000 cycles per second and the above described arrangements provide a particularly beneficial method of producing two receivable signals of different frequencies at a receiving station from a single source of alternating current.

Figure 7:
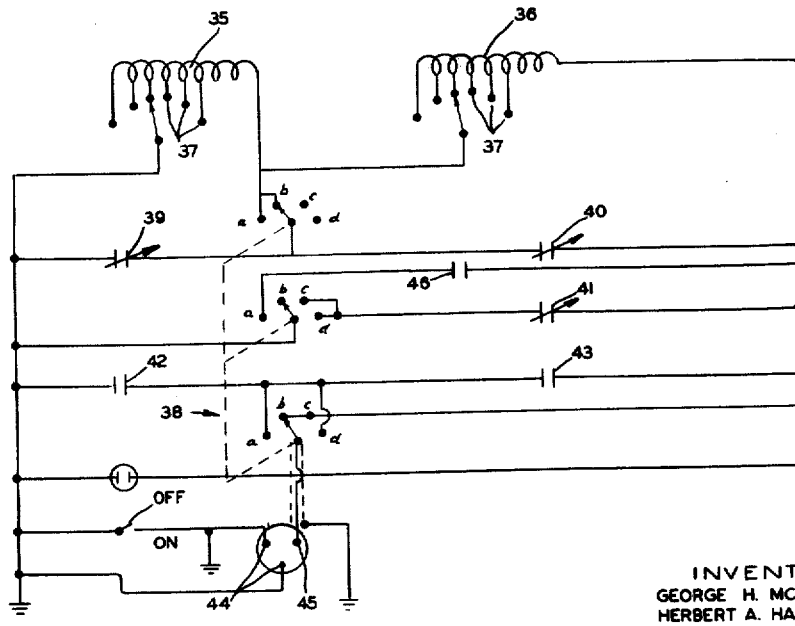
Figure 7 is a schematic circuit diagram of the receiver unit for detecting the electromagnetic fields created by the transmitting system illustrated in Figure 6.

With reference to Figure 7 the receiver system comprises a pair of coils 35 and 36 with suitable tapping points 37 which are wound on a magnetic core material such as ferroxcube and these coils are preferably disposed in physically parallel relation so that they can be swung about an extended axis as disclosed in said United States Patent No. 2,558,972. A gang switch 38 is arranged to selectively connect positions *a, b, c* and *d*. Positions *a* and *d* give a reduced output when the received signal is large preventing overloading of an amplifier (not shown) used in association with the receiver circuit connected to suitable earphones (not shown).

Positions *a* and *b* represent the positions for receiving the 5,000 cycle signal while positions *c* and *d* represent the positions for receiving the 1,000 cycle signal. To receive the 1,000 cycle signal, the coils 35 and 36 are connected in series and tuned to resonate at 1,000 cycles by means of the condensers 39 and 40 and 41. When the switch 38 is swung to the minimum position *d* the signal is taken off from between the voltage dividing condensers 42 and 43, and the signal output is delivered across the terminals 44 and 45.

To receive the 5,000 cycle signal the 5,000 cycle coil 36 is tuned to resonance at 5,000 cycles by the condenser 40. At the same time condenser 39 is connected across coil 35 and is adjusted to give the minimum 1,000 cycle signal across the output terminals 44 and 45. This effect is achieved by tuning the coil 35 by the condenser 39 so that the phase and amplitude of the voltage induced therein by the 1,000 cycle field is made as closely as possible equal and opposite to the voltage induced by the same 1,000 cycle field in the coil 36 when tuned to 5,000 cycles. Thus the effects of the 1,000 cycle field are substantially balanced or bucked out. With such a bucking adjustment it is possible to reduce the 1,000 cycle signal which would otherwise be produced at terminals 44 and 45 by 20 decibels when the receiver is operating at 5,000 cycles.

With the switch 38 in the position *a*, a condenser 46 is connected across the coils 35 and 36 to compensate for the reduction in the effect of the capacity to ground of the cables leading to the terminals 44 and 45. Also in the position *a* the take-off voltage is divided by the condensers 42 and 43.

In the operation of the system, the transmitting coils 3 and 7 are simultaneously energized to create the two electromagnetic low frequency induction fields viz. 1,000 and 5,000 cycles per second with the transmitting coils maintained in a vertical plane. The operator at a distant point with his receiver equipment located generally in line with the plane of the transmitter coil as explained in the said United States Patent No. 2,558,972, rocks the receiver coils about an extended axis according to the simplest and preferred method, and tunes his coils 35 and 36 to detect the 1,000 cycle frequency.

By obtaining a null point at this frequency, the operator is able to determine the direction of the electromagnetic field at the receiving station. In the event that an electrically conductive body is present, the fact that the direction of the field has been shifted will be evident upon the operator finding that the null point at 1,000 cycles is obtained with the extended axis of the receiver coils at an angle to the perpendicular in a direction laterally of the plane of the transmitting coils.

Having obtained a null point indicative of the direction of the electromagnetic field at the receiving station by measuring the 1,000 cycle per second signal the operator then switches the switch 38 to receive the 5,000 cycle per second signal to which his receiver is now tuned, and to buck out to a major degree the 1,000 cycle per second signal. Then, a null point at the 5,000 cycles per second is obtained to obtain the direction of the 5,000 cycle per second electromagnetic field.

In the event that the conductor is a highly conductive material such as most sulphides, it will be found that the response of the receiver at 1,000 and 5,000 cycles per second will correspond, and there will be no change or increase in response with the increased frequency. On the other hand, if the conductor body is a poor conductor such as for instance, a graphite body, there will be a marked increase in the response at the higher frequency. Since the transmitter coil is simultaneously creating the two fields of different frequencies, there is no need for tuning at the transmitter other than the employment of the tuned circuits above described to produce these fields, and the only actual adjusting to be done by the operator after initial tuning in the field in normal use, is to switch between the 1,000 and 5,000 cycle per second electromagnetic fields at the receiver.

By comparison of the results of the different frequencies, the highly conductive materials can be distinguished from graphite bodies and poorer disseminated regions of ore bodies.

While the invention has been particularly described in connection with the use of saturable magnetic core reactor as the non-linear device and has been described in particular in connection with the creation of two different fields of different frequencies, it will be appreciated that the invention may be employed to produce more than two fields of different frequencies. Also other non-linear devices such as rectifiers, thermisters and the like may be employed for creating the current distortion and the non-linear device herein particularly described forms the simplest and most expedient one presently available for carrying out the invention.

It will also be understood that various other modifications in details may also be made without departing from the spirit of the invention and the scope of the appended claims.

What I claim as my invention is:

1. A means of simultaneously creating at least two exploring electromagnetic fields for conductor prospecting from a single alternating current generator comprising in combination with a motor driven generator producing at its operating speed a low frequency fundamental current of substantially sinusoidal form, a saturable reactor connectable with said generator to distort said fundamental current and produce a current including harmonics of the fundamental frequency, a pair of series tuned transmitter coil circuits to be energized by said source to produce low frequency electromagnetic fields, each including a transmitter coil and a tuning condenser, one of said circuits being connectable to said generator and in series with said saturable reactor and tuned to resonance at least substantially at the fundamental frequency, the transmitter coil of said latter circuit having at said fundamental frequency an appreciably higher inductance than said reactor and the other of said circuits being connectable to said saturable reactor and tuned to resonance at least substantially at a harmonic of said fundamental frequency.

2. A means of simultaneously creating at least two low frequency exploring electromagnetic fields for conductor prospecting from a single motor driven alternating current generator comprising in combination with a motor driven alternating current generator having as its operating speed a fundamental low frequency alternating current of substantially sinusoidal form, a non-linear device connected in series with said generator to distort said fundamental current and produce a current rich in harmonics of the fundamental frequency, a series tuned transmitting coil circuit tuned substantially to said fundamental frequency connected in series with said non-linear device and with said generator and adapted to form a resonant load for said generator acting to effect frequency regulation thereof and maintain said operating speed substantially constant, said transmitting coil circuit having at said fundamental frequency an appreciably higher inductance than said non-linear device and a second series tuned transmitting coil circuit tuned to a selected harmonic of said fundamental frequency and being connected with said non-linear device to be excited at said selected harmonic.

3. A device as claimed in claim 2 in which said non-linear device comprises a saturable magnetic core reactor connected in series with said first mentioned series tuned transmitting coil circuit.

4. A device as claimed in claim 3 in which said first mentioned series tuned transmitting coil circuit includes a transmitting coil having an inductance at said fundamental frequency approximately at least four times the inductance of said reactor at said fundamental frequency.

5. A device as claimed in claim 4 in which said transmitter coil circuits comprise separate series tuned transmitter coils.

6. A device as claimed in claim 5 in which means are provided to support said transmitter coils in vertical coplanar relation.

7. A transmitting unit for an electromagnetic conductor prospecting apparatus comprising a gasoline engine driven alternating current generator capable of delivering a fundamental low frequency alternating current of substantially sinusoidal wave form, a series tuned transmitting coil connected in series with said generator and being adapted to form a resonant load for said generator acting to effect frequency regulations thereof, a saturable magnetic core reactor connectable in series with said transmitting coil and generator to distort said fundamental current and produce a current containing harmonics of the fundamental current, said transmitting coil having at said fundamental frequency an appreciably greater inductance than said reactor, a second series tuned transmitting coil connectable across at least a portion of said reactor and tuned to a selected harmonic of said fundamental frequency to resonate at said selected harmonic, and means to support said transmitting coils in a vertical position.

8. A device as claimed in claim 7 in which said saturable magnetic core reactor is arranged to saturate substantially at the point in the cycle of the fundamental current corresponding to the selected harmonic to which said second transmitting coil is tuned.

9. A device as claimed in claim 8 in which the inductance of the first transmitting coil is approximately four times the maximum induction of said saturable magnetic core prior to saturation of said core.

References Cited in the file of this patent

UNITED STATES PATENTS

| | | |
|---|---|---|
| 1,537,609 | Hogan | May 12, 1925 |
| 1,559,869 | Hartley | Nov. 3, 1925 |
| 1,718,351 | Guilford | June 25, 1929 |
| 1,818,331 | Jakosky | Aug. 11, 1931 |
| 2,117,752 | Wrathall | May 17, 1938 |
| 2,139,460 | Patapenko | Dec. 6, 1938 |
| 2,146,053 | Campbell | Feb. 7, 1939 |
| 2,288,486 | Riolin | June 30, 1942 |
| 2,354,636 | Hershberger | July 25, 1944 |
| 2,427,204 | Ferguson | Sept. 9, 1947 |
| 2,606,959 | Leitch et al. | Aug. 12, 1952 |
| 2,616,954 | Pruch et al. | Nov. 4, 1952 |
| 2,642,477 | Puranen et al. | June 16, 1953 |
| 2,690,537 | Weiss et al. | Sept. 28, 1954 |
| 2,776,373 | Mischler | Jan. 1, 1957 |